United States Patent [19]

Brodie

[11] 4,399,830
[45] Aug. 23, 1983

[54] SAFETY PRESSURE RELIEF DEVICE ASSEMBLY

[75] Inventor: George W. Brodie, Wellington, England

[73] Assignee: IMI Marston Limited, Wolverhampton, England

[21] Appl. No.: 278,613

[22] Filed: Jun. 29, 1981

[30] Foreign Application Priority Data

Jul. 21, 1980 [GB] United Kingdom ............... 8023777

[51] Int. Cl.³ .......................................... F16K 13/04
[52] U.S. Cl. ............................... 137/68 R; 220/89 A
[58] Field of Search ...................................... 177/68 R

[56] References Cited

U.S. PATENT DOCUMENTS 3,845,878 11/1974 Carlson ............................ 137/68 R
3,901,259 8/1975 Banbury ........................... 137/68 R

FOREIGN PATENT DOCUMENTS 517502 2/1953 Belgium ............................ 137/68 R Primary Examiner—Harold W. Weakley
Attorney, Agent, or Firm—Cushman, Darby & Cushman

[57] ABSTRACT

A safety pressure relief device including a pair of annular disc holders adapted to clamp between them a reverse buckling disc, one of the annular discs being located within the other disc and an arrester bar being disposed within the confines of the other disc member.

9 Claims, 6 Drawing Figures

U.S. Patent     Aug. 23, 1983     4,399,830
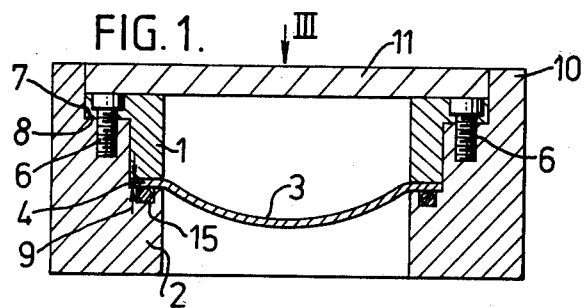
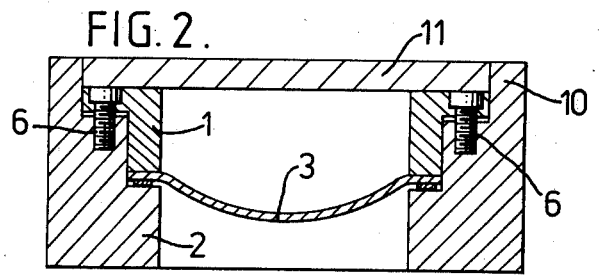
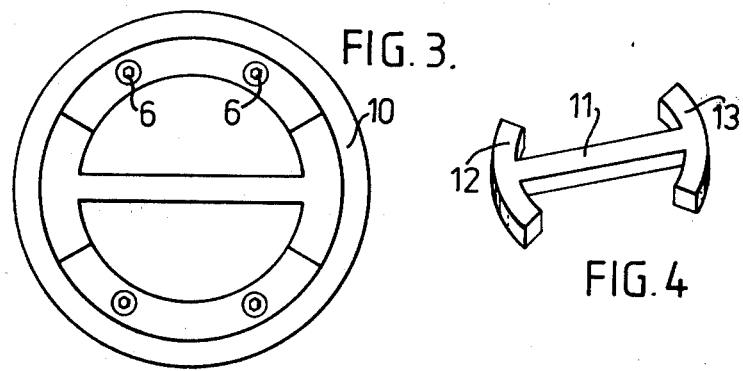
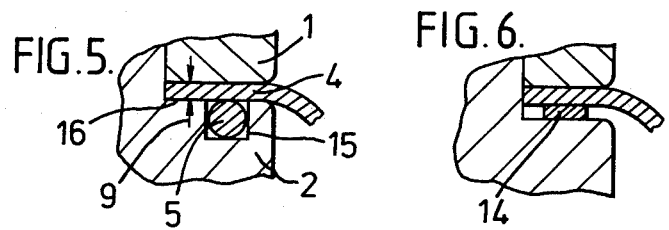

SAFETY PRESSURE RELIEF DEVICE ASSEMBLY

BACKGROUND OF THE INVENTION

This invention relates to safety pressure relief devices and has particular reference to assemblies of such devices incorporating arrester bars.

One known type of safety pressure relief device is a reverse buckling device. Reverse buckling discs have been proposed in British Patents Specifications Nos. 1 355 486 and 1 444 206 and the devices described in those specifications have been found to work extremely satisfactorily. The devices described in the above specifications, which are referred to as reverse buckling pressure relief discs, utilise discs having a central portion which is convex on one side and concave on the other and which is held between two annular members around an edge region of the disc. In use the pressure relief apparatus incorporating the disc and annular members is located upon a vessel with the convex side of the disc facing towards the interior of the vessel so as to be in direct contact with the fluid contained within the vessel. When the fluid pressure within the vessel reaches a predetermined limit the curvature of the disc is reversed and the disc pulls free from the annular members and is released. Because the disc is completely released from the holder the entire area of the holder is available for venting excess pressure. It has been found, however, that in many cases it is desirable to provide an arrester bar to catch the disc, which is blown out by the excess pressure to prevent the disc causing damage downstream. If the arrester bar is positioned correctly, and this is a matter for simple experiment, the disc is found to wrap itself around the arrester bar and is firmly held in position even after the excess pressure has been vented. Heretofore the arrester bars have been provided in a separate item which is attached to the reverse buckling assembly as an option.

SUMMARY OF THE INVENTION

By the present invention there is provided a safety pressure relief device comprising a pressure relief disc having a central domed portion and an annular peripheral region, first and second annular disc holders adapted to locate and hold the peripheral region of the relief disc, the first of the annular disc holders being located within the second annular disc holder, wherein the improvement comprises an arrester bar located within the second annular disc holder and adapted to be located, in use, downstream of the annular disc.

The relief disc may be a reverse buckling disc having its concave side towards the arrester bar and being so held between the annular disc holders as to be completely released from the annular disc holders after reversing under the action of excess pressure on the convex side.

The arrester bar may be a separate item secured to the first or second annular disc holder. The arrester bar may be integral with the first holder. The arrester bar may be in the form of a substantially I-shaped bar adapted to be located in the second holder.

The second holder may have a main bore therethrough with a second bore of wider diameter providing a first step surface on which the disc is located and a third bore of yet wider diameter providing a second step surface to which the first holder is attached.

The reverse buckling disc may be clamped between two planar gripping surfaces on the first and second annular disc holders, the planar gripping surface on the second holder being formed on the first step. There may be provided abutment means to restrain the disc from spreading radially outward under the action of pressure on the convex side of the disc.

The pair of annular disc holders may be fixed in contact with each other by clamping means to define between portions of the disc holders a gap of predetermined width, the peripheral region of the relief disc being located in the gap, there being separate sealing and disc restraining means, the sealing means comprising a compressible sealing ring compressed to a predetermined amount between the edge region of the disc in the gap of predetermined width. The compressible sealing means may comprise an O-ring.

BRIEF DESCRIPTION OF THE DRAWINGS

By way of example embodiments of the present invention will now be described with reference to the accompanying drawings, of which:

FIG. 1 is a cross-section of one embodiment of the invention;

FIG. 2 is a cross-section of an alternative embodiment of the invention;

FIG. 3 is a view of FIG. 1 along the lines of the arrow III;

FIG. 4 is a perspective view of an arrester bar;

FIG. 5 is an enlarged view of the sealing means of FIG. 1; and

FIG. 6 is an enlarged view of the sealing means of FIG. 2.

DESCRIPTION OF THE PREFERRED EMBODIMENTS

The relief pressure device is adapted to be attached to a vessel (not shown) between flanges of a pipe attached to the vessel in the normal way. The device comprises an annular member 1 (FIG. 1) and a second annular member 2. The annular members trap between them a reverse buckling disc 3. The disc is trapped by its peripheral region 4, as is shown more clearly in FIG. 5. An O-ring 5 is compressed by the peripheral region of the disc 4 to effect a seal. The two annular members 1 and 2 are clamped together by means of a series of bolts 6 which are firmly screwed down so that the faces 7 and 8 abut one another to define a gap 9 of given width in the manner described in British Patent Specification No. 1 444 206 with the bore of annular member 2 providing the radial abutment described in that specification. It can be seen that the second annular disc member 2 has an upstanding wall portion 10 which accommodates not only the annular disc holder 1 but also an arrester bar 11. The arrester bar is generally of I-shape as is shown in FIG. 4 and the ends 12, 13 of the arrester bar are curved so as to fit within the peripheral wall 10 and to locate firmly therein. If desired the arrester bar can be screwed or bolted directly to the disc holders.

In a modification of the invention as illustrated in FIG. 2 like parts are given like numbers and it can be seen that the main difference between the two devices is that the bolts 6 compress a compressible sealing ring 14 to the extent that they are tightened. Such a device is described in more detail in British Patent Specification No. 1 355 486 described above. It can also be readily appreciated that the two devices illustrated in FIGS. 1 and 2 have numerous common parts. Thus the disc 3, the arrester bar 11 and the annular member 1 are virtually identical in shape. Similarly, the annular members 2 are virtually identical, requiring only a groove 15 to be machined in the face 16 of the annular member to differentiate the device illustrated in FIG. 1 from the device illustrated in FIG. 2.

It will be appreciated, therefore, that the devices described above are improvements over the devices described in British Patents Specifications Nos. 1 355 486 and 1 444 206 in that the number of common parts is increased and also the provision of an integral arrester bar enables the overall complexity and height of the devices to be reduced compared to the prior art devices.

I claim:

1. A safety pressure relief device comprising:

a pressure relief disc having a central domed portion and an annular peripheral region;

first and second annular disc holders adapted to locate and hold the peripheral region of the relief disc, the first of the annular disc holders being located within the second annular disc holder;

an arrester bar located within the second annular disc holder and adapted to be located, in use, downstream of the annular disc;

the relief disc being a reverse buckling disc having its concave side towards the arrester bar and being so held between the annular disc holders as to be completely released from the annular disc holders after reversing under the action of excess pressure on the convex side.

2. A device as claimed in claim 1 in which the arrester bar is a separate item secured to the first or second annular disc holder.

3. A device as claimed in claim 1 in which the arrester bar is integral with the first holder.

4. A device as claimed in claim 2 in which the arrester bar is in the form of a substantially I-shaped bar adapted to be located in the second holder.

5. A device as claimed in claim 1 in which the second holder has a main bore therethrough with a second bore of wider diameter providing a first step surface on which the disc is located and a third bore of yet wider diameter providing a second step surface to which the first holder is attached.

6. A device as claimed in claim 5 in which the reverse buckling disc is clamped between two planar gripping surfaces on the first and second annular disc holders, the planar gripping surface on the second holder being formed on the first step.

7. A device as claimed in claim 6 in which there is provided abutment means to restrain the disc from spreading radially outward under the action of pressure on the convex side of the disc.

8. A device as claimed in claim 5 in which the annular disc holders ae fixed in contact with each other by clamping means to define between portions of the disc holders a gap of predetermined width, the peripheral region of the relief disc being located in the gap, there being separate sealing and disc restraining means, the sealing means comprising a compressible sealing ring compressed to a predetermined amount between the edge region of the disc in the gap of predetermined width, the restraining means comprising a radial abutment external of the peripheral edge of the disc.

9. A device as claimed in claim 8 in which the compressible sealing means comprises an O-ring.

* * * * *